Oct. 1, 1935.  J. F. THOMSON  2,016,185
PROJECTION SCREEN
Filed March 28, 1935
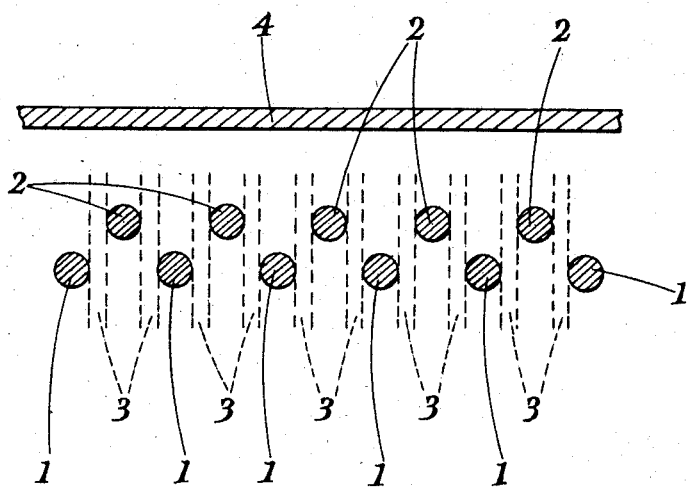
INVENTOR
JAMES F. THOMSON
BY
ATTORNEY

UNITED STATES PATENT OFFICE 2,016,185

PROJECTION SCREEN

James Ford Thomson, Falkirk, Scotland

Application March 28, 1935, Serial No. 13,573
In Great Britain March 29, 1934

4 Claims. (Cl. 88—24)

The invention relates to projection screens and is designed to provide a screen which will give an illusion of solidity when a picture is projected upon it.

The improved screen further appears to give less distortion than the ordinary screen when viewed from the sides of the auditorium or the like.

I have found that improved results can be obtained by using a screen which comprises in effect fine cords, wires or strips arranged vertically and spaced so that there is a non-reflective slit between each reflecting strip.

The visible part of the surface of each cord, wire or strip is essentially curved in the horizontal plane and preferably they are circular in cross-section; for convenience they will be hereinafter referred to as cords. The best results are obtained by using two rows of reflecting cords, a back row being spaced backwardly a little from a front row and the gaps between cords in each row being greater than the thickness of a cord, so that there are definite non-reflecting slits between larger reflecting areas when any part of the screen is viewed from the immediate front with each cord in the back row in the centre of the gap between two cords of the front row; and the same is true on the average when the screen is viewed from any ordinary position in a well-arranged auditorium.

While the fact that the illusion of solidity is produced is not affected by any theory as to the cause of it, it is believed that the illusion is due to the combination of three factors, namely:— a. The fact that the cords are approximately circular in cross section causes each eye to see a different area of the same cord. The increment of all these differences may come to an appreciable quantity so that taking the screen as a whole when a picture is thrown upon it the eyes will in reality see two slightly different pictures. Each eye will see a different picture.

b. The provision of non-reflective areas results in a greater contrast of tonal values being obtained than in the usual screen.

c. The fact that one row of cords is set behind the other results in the fact that a picture thrown upon the screen is divided into two parts, the part reflected by the front row and the part reflected by the rear row. Each of these two portions of the picture necessitate a different focus of the eyes. The attempt of the eyes to focus both of these parts of the picture simultaneously may result in one eye tending to focus upon the cords of the front row and the other upon the cords of the back row in any area upon which they concentrate and the impression of depth being gained by the observer for that reason.

The preferred arrangement of cords as viewed in cross section is shown by the drawing forming part of this specification in which the front row of cords is shown at 1, 1, 1 and the back row at 2, 2, 2. The actual dimensions are important: the cords should be less than $\frac{1}{32}$ inch in diameter, the size varying with the size of the screen and the depth of the auditorium. The clear distance between cords in each row for the best results should be of the order of twice the diameter of a cord, the front and back row cords being preferably of the same diameter and the intervals between cords the same in each row, so that the non-reflective area of the screen represented by the slits 3 will be in the neighbourhood of one half to one quarter of the reflecting area without allowing for the curve of the cords, or in the neighbourhood of something less than one third if the visible part of the surface of the cords is semi-circular and this is allowed for.

The distance between the two rows of cords may advantageously be less than 2 inches and preferably about ¼ inch, or less if the cords are less than ⅛ inch in diameter.

The cords may be suitably coated or impregnated to give them a good reflecting surface, say with white paint; and they should lie substantially vertically as viewed from the front, though the whole screen may be inclined, for example to make the projection beam strike the cords substantially at right angles. In order to ensure that the slits between cords are non-reflective a background of dark colour and light absorbing nature may be used as indicated at 4.

Preferably the cords in the front row are in the same plane or substantially so and the cords in the back row in a parallel plane, though relatively slight variations are immaterial.

While each single cord in the second row spaced midway between each pair of adjacent single cords in the front row constitutes the preferred arrangement it might in some cases be possible for each vertical reflecting strip in each or either row to present two or even more front surfaces convex in the horizontal plane and with or without a non-reflecting slit between them, so long as the balance between the two reflecting rows and the non-reflecting parts is approximately preserved to retain the possibility of combining the effects of the three factors set out as possibly causing the illusion. For example two thinner cords in the back row either touching or slightly spaced apart might be placed midway of the gap between larger single cords or between similar groups in the front row and various other equivalents from that point of view might be used without departing from the scope, for example, of claim 2 or claim 3. Each row may of course be curved as a whole if desired.

I claim:—

1. A projection screen comprising two rows of spaced reflecting cords substantially vertical as viewed from in front, one row being spaced a little behind the other with the cords immediately behind spaces between the cords of the front row but not filling the spaces, and means to render the spaces between visible cords non-reflective.

2. A projection screen comprising a number of thin vertical reflecting cords each having a curved front surface arranged to present different aspects of the cord to the two eyes respectively of an observer, cords further from the observer alternating with cords slightly closer to him, and means to render thinner areas between visible cords non-reflective.

3. A projection screen comprising a number of thin vertical reflecting cords each having a front surface convex in the horizontal plane to present different aspects of the cords to the two eyes respectively of an observer, cords further from the observer alternating with cords slightly closer to him, and means to render thinner areas between visible cords non-reflective.

4. A projection screen comprising two vertical rows of circular reflecting cords each of diameter in the region of $\frac{1}{8}$ inch, the cords in each row having a clear space between them greater than but less than twice the diameter of a cord, the cords in the second row being spaced backwardly from those in the first row by a distance in the region of $\frac{1}{4}$ inch and midway of the gaps in the front row, the two rows being backed by a non-reflecting backing.

JAMES FORD THOMSON.